(12) United States Patent
Luo

(10) Patent No.: US 12,282,362 B2
(45) Date of Patent: Apr. 22, 2025

(54) UNDER-SCREEN SUPPORT STRUCTURE AND DISPLAY DEVICE

(71) Applicant: BOE Technology Group Co., Ltd., Beijing (CN)

(72) Inventor: Xiaofei Luo, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 246 days.

(21) Appl. No.: 17/631,406

(22) PCT Filed: Apr. 8, 2021

(86) PCT No.: PCT/CN2021/085872
§ 371 (c)(1),
(2) Date: Jan. 28, 2022

(87) PCT Pub. No.: WO2021/232980
PCT Pub. Date: Nov. 25, 2021

(65) Prior Publication Data
US 2022/0276678 A1    Sep. 1, 2022

(30) Foreign Application Priority Data
May 21, 2020 (CN) .......................... 202010434982.0

(51) Int. Cl.
*G06F 1/16*    (2006.01)

(52) U.S. Cl.
CPC .......... *G06F 1/1656* (2013.01); *G06F 1/1624* (2013.01); *G06F 1/1652* (2013.01)

(58) Field of Classification Search
CPC .... G06F 1/1656; G06F 1/1624; G06F 1/1652; G06F 1/1675; F16G 13/00; F16G 13/20;
(Continued)

(56) References Cited

U.S. PATENT DOCUMENTS 10,175,792 B2 *   1/2019   Kim ....................... G06F 1/1652
10,553,135 B2 *   2/2020   Lee ......................... G09F 9/301
(Continued)

FOREIGN PATENT DOCUMENTS

CN    2659843 Y    12/2004
CN    203759605 U   8/2014
(Continued)

OTHER PUBLICATIONS

CN02010434982.0 first office action.

*Primary Examiner* — Rockshana D Chowdhury
(74) *Attorney, Agent, or Firm* — IPro, PLLC

(57) ABSTRACT

An under-screen support structure and a display device. The under-screen support structure is configured to support a rollable and slidable display screen (6) in the display device, and includes a sliding middle frame (1), a rotating shaft (2) and a support chain (3). The rotating shaft is mounted on the side of the sliding middle frame facing a rollable and slidable portion of the display screen, and the rotating shaft is transmittingly connected to the display screen by means of the support chain. The support chain includes a plurality of support strips, the extension direction of the support strips is parallel to the axis of the rotating shaft. The cross section of each support strip perpendicular to the axis of the rotating shaft is trapezoidal, and the size of the side facing away from the rotating shaft is greater than that of the side close to the rotating shaft.

11 Claims, 3 Drawing Sheets

(58) Field of Classification Search
CPC ... F16M 11/043; F16M 11/18; H04M 1/0235; H04M 1/0268; F16H 19/025; F16H 19/064; F16H 19/0645; G09F 9/301
See application file for complete search history.

(56) References Cited

U.S. PATENT DOCUMENTS

| | | | | |
|---|---|---|---|---|
| 10,747,269 | B1* | 8/2020 | Choi | G06F 1/1652 |
| 11,003,207 | B2* | 5/2021 | Kim | G06F 1/3278 |
| 11,012,546 | B1* | 5/2021 | Song | G06F 1/1656 |
| 11,029,733 | B2* | 6/2021 | Lee | G06F 1/1652 |
| 11,058,018 | B1* | 7/2021 | Yoon | G06F 1/1643 |
| 11,112,826 | B2* | 9/2021 | Ko | G06F 1/1647 |
| 11,204,629 | B1* | 12/2021 | Kwak | H04M 1/0268 |
| 11,219,132 | B2* | 1/2022 | Song | H05K 5/0017 |
| 11,315,447 | B2* | 4/2022 | Feng | G06F 1/1652 |
| 11,416,036 | B2* | 8/2022 | Yin | G06F 1/1652 |
| 11,514,823 | B2* | 11/2022 | Shin | G06F 1/1624 |
| 11,647,598 | B2* | 5/2023 | Zhang | G06F 1/1652 361/807 |
| 11,665,839 | B2* | 5/2023 | Zeng | G06F 1/1652 361/807 |
| 11,706,904 | B2* | 7/2023 | Kang | H05K 7/20336 361/700 |
| 12,075,572 | B2* | 8/2024 | Jo | G06F 1/1652 |
| 2013/0058063 | A1* | 3/2013 | O'Brien | G06F 1/1624 361/807 |
| 2016/0231843 | A1* | 8/2016 | Kim | G06F 3/0412 |
| 2017/0285688 | A1 | 10/2017 | Sun | |
| 2018/0014417 | A1 | 1/2018 | Seo et al. | |
| 2018/0102072 | A1* | 4/2018 | Lee | G09F 9/301 |
| 2019/0235577 | A1 | 8/2019 | Wang et al. | |
| 2020/0033913 | A1 | 1/2020 | Yang | |
| 2020/0337163 | A1 | 10/2020 | Liu | |
| 2021/0044683 | A1 | 2/2021 | He et al. | |
| 2021/0181801 | A1* | 6/2021 | Yin | G06F 1/1652 |
| 2021/0204433 | A1 | 7/2021 | Luo et al. | |
| 2021/0212211 | A1 | 7/2021 | Tang et al. | |
| 2021/0352813 | A1* | 11/2021 | Cho | G06F 1/1658 |
| 2021/0359251 | A1 | 11/2021 | Xu et al. | |
| 2021/0366318 | A1 | 11/2021 | Feng | |
| 2021/0373603 | A1* | 12/2021 | Feng | G06F 1/1624 |
| 2022/0011821 | A1* | 1/2022 | Han | G06F 1/1624 |
| 2022/0255023 | A1* | 8/2022 | Cai | B32B 3/14 |
| 2023/0098597 | A1* | 3/2023 | Gao | H05K 5/0217 361/807 |
| 2023/0209750 | A1* | 6/2023 | Kim | G06F 1/1624 361/807 |

FOREIGN PATENT DOCUMENTS

| | | |
|---|---|---|
| CN | 104714699 A | 6/2015 |
| CN | 108259649 A | 7/2018 |
| CN | 108319339 A | 7/2018 |
| CN | 108519795 A | 9/2018 |
| CN | 108520702 A | 9/2018 |
| CN | 208014279 U | 10/2018 |
| CN | 108831310 A | 11/2018 |
| CN | 208061588 U | 11/2018 |
| CN | 109147571 A | 1/2019 |
| CN | 110033707 A | 7/2019 |
| CN | 110211506 A | 9/2019 |
| CN | 110322793 A | 10/2019 |
| CN | 110580858 A | 12/2019 |
| CN | 110782783 A | 2/2020 |
| CN | 110868486 A | 3/2020 |
| CN | 111161636 A | 5/2020 |
| CN | 111425725 A | 7/2020 |
| CN | 212156402 U | 12/2020 |
| EP | 3654162 A1 | 5/2020 |
| WO | 2019153256 A1 | 8/2019 |

\* cited by examiner

UNDER-SCREEN SUPPORT STRUCTURE AND DISPLAY DEVICE

CROSS-REFERENCE TO RELATED APPLICATIONS

The present disclosure is a national phase entry under 35 U.S.C § 371 of International Application No. PCT/CN2021/085872, filed Apr. 8, 2021, which claims the priority of the Chinese patent application No. 202010434982.0 filed to the China National Intellectual Property Administration on May 21, 2020, and entitled "Under-screen Supporting Structure and Display Apparatus", of which the entire contents are incorporated herein by reference.

FIELD

The present disclosure relates to the field of display, in particular to an under-screen supporting structure and a display apparatus.

BACKGROUND

With the progress of science and technology and the development of society, a flexible display panel gradually enters the visual field of consumers, and a bendable and rollable panel brings brand new user experience to the consumers while facilitating the life of the consumers. When a flexible screen of a current display apparatus is flattened in a sliding mode, due to characteristics of a film material, upper and lower portions of a screen at a rotating shaft are prone to warping, and stress concentration is generated at the warping positions of the screen during sliding.

SUMMARY

Embodiment of the present disclosure provide an under-screen supporting structure, configured to support a rollable and slidable display screen in a display apparatus, and including: a sliding middle frame, a rotating shaft and a supporting chain;
  the rotating shaft is installed on one side, facing a rolling and sliding part of the display screen, of the sliding middle frame, and the rotating shaft is in transmission connection with the display screen through the supporting chain; and
  the supporting chain includes a plurality of sections of supporting strips, and an extending direction of the supporting strips is parallel to an axis of the rotating shaft; and cross sections, perpendicular to the axis of the rotating shaft, of the supporting strips are trapezoidal, and sizes of one side, facing away from the rotating shaft, of the supporting strips are greater than sizes of another one side, close to the rotating shaft, of the supporting strips.

In one possible implementation, in the above under-screen supporting structure provided by the embodiments of the present disclosure, one side, facing away from the rotating shaft, of the supporting chain is in transmission connection with the display screen through a buffer layer.

In one possible implementation, in the above under-screen supporting structure provided by the embodiments of the present disclosure, a material of the buffer layer is silica gel.

In one possible implementation, in the above under-screen supporting structure provided by the embodiments of the present disclosure, an outer ring of the rotating shaft is a polygon, and any edge of the polygon is matched with any section of the supporting strips.

In one possible implementation, in the above under-screen supporting structure provided by the embodiments of the present disclosure, an length of any edge of the polygon is equal to the size of one side, close to the rotating shaft, of any section of the supporting strips.

In one possible implementation, in the above under-screen supporting structure provided by the embodiments of the present disclosure, when the supporting chain is in a flattened state, an included angle θ formed between two adjacent side surfaces in every two adjacent sections of supporting strips and the number n of edges of the polygon meet the following relation: θ=360°/n.

In one possible implementation, in the above under-screen supporting structure provided by the embodiments of the present disclosure, an outer ring of the rotating shaft is circular.

In one possible implementation, in the above under-screen supporting structure provided by the embodiments of the present disclosure, a flexible layer is arranged between the rotating shaft and the supporting chain.

In one possible implementation, in the above under-screen supporting structure provided by the embodiments of the present disclosure, a material of the flexible layer is rubber.

In one possible implementation, in the above under-screen supporting structure provided by the embodiments of the present disclosure, the sliding middle frame contacts with one side, facing away from the display screen, of the supporting chain.

The embodiments of the present disclosure further provide a display apparatus, a display screen and a fixed machine shell. The display apparatus further includes the above-mentioned under-screen supporting structure;
  a rolling and sliding part of the display screen is in transmission connection with a rotating shaft in the under-screen supporting structure through a supporting chain in the under-screen supporting structure; and
  a non-rolling and non-sliding part of the display screen is fixed on the fixed machine shell.

DETAILED DESCRIPTION OF THE EMBODIMENTS

Figure 1:
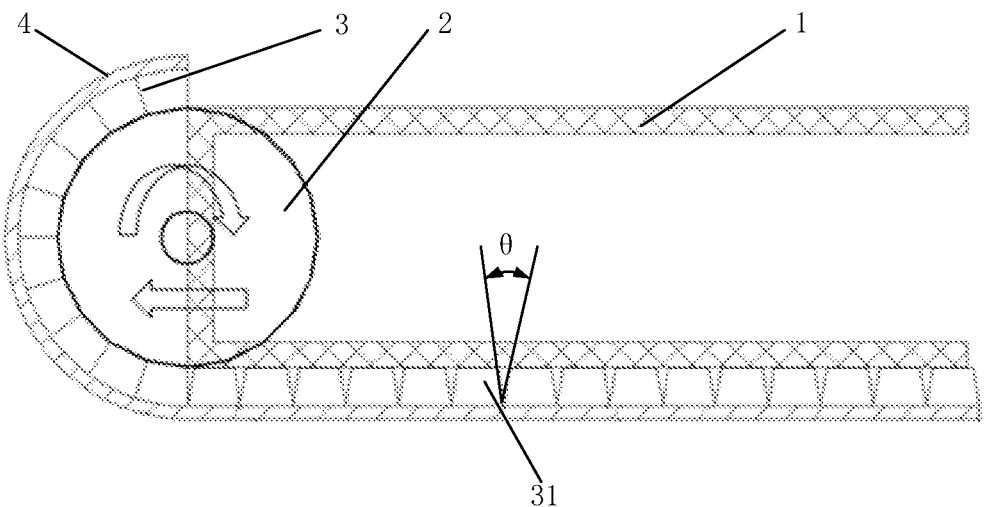
FIG. 1 is a schematic structural diagram of an under-screen supporting structure provided by an embodiment of the present disclosure.

The technical solutions in the embodiments of the present disclosure will be described clearly and completely with reference to the drawings in the embodiments of the present disclosure. Obviously, the described embodiments are only part of the embodiments of the present disclosure, but not all the embodiments. On the basis of the described embodiments of the present disclosure, all other embodiments obtained by a person of ordinary skill in the art without inventive efforts fall within the protection scope of the present disclosure. In the description of the present disclosure, it should be noted that the orientation or position relation indicated by the terms such as "center", "upper", "lower", "left", "right", "vertical", "horizontal", "inner", "outer", "clockwise", "anticlockwise" and the like is based on the orientation or position relation shown in the drawings, and is only used for facilitating the description of the present disclosure and the description simplification, rather than indicating or implying that the referred apparatus or element must have a specific orientation, or be configured and operated in the specific orientation, and thus cannot be understood as a limitation to the present disclosure.

As shown in FIG. 1, the embodiments of the present disclosure provide an under-screen supporting structure, configured to support a rollable and slidable display screen 6 in a display apparatus, and including: a sliding middle frame 1, a rotating shaft 2 and a supporting chain 3.

The rotating shaft 2 is installed on one side, facing a rolling and sliding part of the display screen 6, of the sliding middle frame 1 and is in transmission connection with the display screen 6 through the supporting chain 3.

The supporting chain 3 includes a plurality of sections of supporting strips 31, and an extending direction of the supporting strips 31 is parallel to an axis of the rotating shaft 2; and cross sections, perpendicular to the axis of the rotating shaft 2, of the supporting strips 31 are trapezoidal, and sizes of one side, facing away from the rotating shaft 2, of the supporting strips are greater than sizes of one side, close to the rotating shaft 2, of the supporting strips. That is, a cross section, perpendicular to the axis of the rotating shaft 2, of each supporting strip 31 is trapezoidal, and a size of one side, facing away from the rotating shaft 2, of the each supporting strip is greater than a size of one side, close to the rotating shaft 2, of the each supporting strip.

The above under-screen supporting structure supports the rollable and slidable display screen 6 in the rollable and slidable display apparatus, and the display screen 6 may be a flexible screen or a multi-section spliced screen and the like, which is not specifically limited here. Specifically, the above under-screen supporting structure includes the sliding middle frame 1, the rotating shaft 2 and the supporting chain 3. The rotating shaft 2 is installed on one side, facing the rolling and sliding part of the display screen 6, of the sliding middle frame 1, one side, facing away from the sliding middle frame 1, of the rotating shaft 2 is in transmission connection with the display screen 6 through the supporting chain 3; the supporting chain 3 includes the plurality of sections of supporting strips 31 arranged side by side. The extending direction of the supporting strips 31 is parallel to the axis of the rotating shaft 2, that is, the supporting strips 31 extend in the axis direction of the rotating shaft 2, the supporting strips 31, making contact with the rotating shaft 2, in the supporting chain 3 are all parallel to the axis of the rotating shaft 2 all the time, and the supporting strips 31, not making contact with the rotating shaft 2, in the supporting chain 3 are all parallel to the axis of the rotating shaft 2 all the time as well. The cross sections, perpendicular to the axis of the rotating shaft 2, of the supporting strips 31 are trapezoidal, and the sizes of the side, facing away from the rotating shaft 2, of the supporting strips 31 are greater than the sizes of the side, close to the rotating shaft 2, the supporting strips 31, so that one side, facing away from the display screen 6, of the supporting chain 3 is tightly wound around the rotating shaft 2. In rolling and sliding processes of the display screen 6, the sliding middle frame 1 horizontally moves leftwards, the supporting chain 3 is unfolded rightwards along with the display screen 6, the rotating shaft 2 rotates clockwise under the action of the supporting chain 3, and a horizontal moving distance of the sliding middle frame 1 is equal to a rotating arc length of the rotating shaft 2. The rolling and sliding part of the display screen 6 is supported by the supporting chain 3 and the rotating shaft 2 installed on the sliding middle frame 1. In an unfolding process of the rolling and sliding part, a clockwise rotating arc length of the supporting chain 3 wound on the rotating shaft 2 is equal to the rotating arc length of the rotating shaft 2, and then an unfolding length of the display screen 6 is equal to the clockwise rotating arc length of the supporting chain 3. At the moment, a leftward moving distance of the sliding middle frame 1 is equal to the rotating arc length of the rotating shaft 2, so that the sliding middle frame 1 and the supporting chain 3 can support the unfolded display screen 6 in time to prevent the display screen 6 from being creased or warped.

Therefore, the supporting chain 3 is arranged below the rolling and sliding part of the display screen 6, and the supporting chain 3 is matched with the rotating shaft 2, so that on the basis of strengthening under-screen supporting, local warping of the screen is avoided, uniform unfolding of the display screen 6 is ensured, and meanwhile, the stability of the screen is improved.

In one possible implementation, the supporting strips 31 in the supporting chain 3 are steel strips.

Optionally, one side, facing away from the rotating shaft 2, of the supporting chain 3 is in transmission connection with the display screen 6 through a buffer layer 4.

In one possible implementation, the buffer layer 4 is arranged below the rolling and sliding part of the display screen 6, and the supporting chain 3 is bonded on the buffer layer 4 so as to prevent the supporting chain 3 from damaging the display screen 6.

It should be noted that a main effect of the buffer layer 4 is to prevent the supporting chain 3 from damaging the display screen 6, and therefore all materials capable of achieving the above effect can serve as the so-called buffer layer 4 above. Optionally, a material of the buffer layer 4 is silica gel.

Optionally, an outer ring of the rotating shaft 2 is a polygon, and any of the polygon is matched with any section of the supporting strips 31. The matching here means that when the supporting chain 3 makes contact with the rotating shaft 2, each section of supporting strip 31 may be accurately wound on the outer ring of the rotating shaft 2, and slipping between the supporting chain 3 and the rotating shaft 2 is avoided.

In one possible implementation, as shown in FIG. 1, the rotating shaft 2 is a polygonal special-shaped shaft, and an edge length of the polygon is matched with a short edge of the steel strip, so that the rotating shaft 2 is matched with the under-screen supporting chain 3 during rotation, and it is ensured that the display screen 6 cannot slip in the rolling and sliding processes.

Optionally, the length of any edge of the polygon is equal to the size of one side, close to the rotating shaft 2, of any section of the supporting strips 31.

In one possible implementation, the edge length of the polygon is consistent with that of the short edge of the steel strip, so that a slipping or loosening phenomenon is avoided.

Optionally, when the supporting chain is in a flattened state, an included angle θ formed between two adjacent side surfaces in every two adjacent sections of supporting strips and the number n of edges of the polygon meet the following relation:

$$\theta = 360°/n.$$

It should be noted that when the supporting chain is in the flattened state, the included angle θ between the two adjacent side surfaces of every two adjacent sections of supporting strips and the number n of the edges of the polygon meet the above relation to guarantee that the rotating shaft contacts with the supporting strips, and under acting force of the rotating shaft, the side surfaces of the two adjacent supporting strips can be attached to avoid the slipping or loosening phenomenon.

Optionally, an outer ring of the rotating shaft 2 is circular.

Optionally, a flexible layer 5 is arranged between the rotating shaft 2 and the supporting chain 3.

Figure 2:
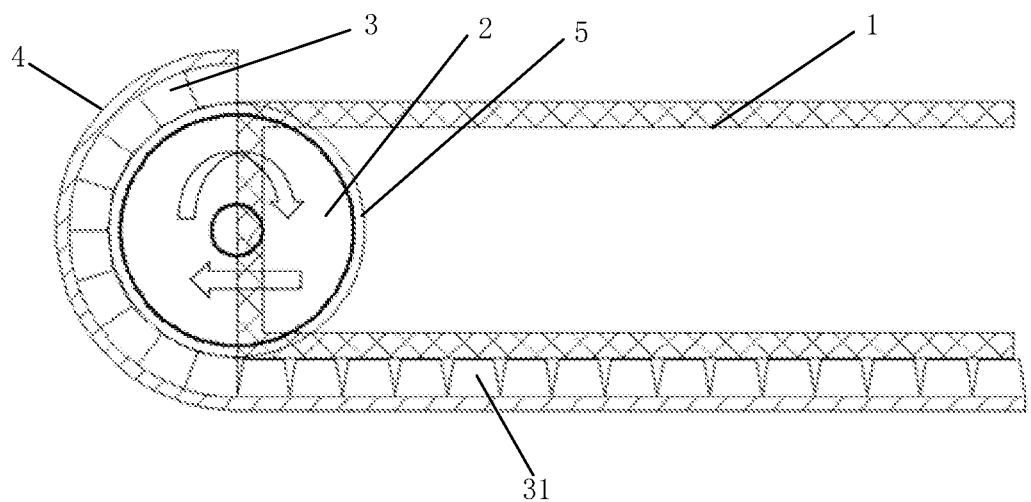
FIG. 2 is a schematic structural diagram of another under-screen supporting structure provided by an embodiment of the present disclosure.

In one possible implementation, as shown in FIG. 2, the rotating shaft 2 is in a standard circular shape, and the upper portion of the rotating shaft 2 is covered with the flexible layer 5 and makes contact with the under-screen supporting chain 3 under the display screen 6. The flexible layer 5 has a certain compression amount, it can be guaranteed that the under-screen steel strip and the rotating shaft 2 are combined more firmly, meanwhile, friction force is reduced, and resistance is smaller in flattening and rolling processes.

It should be noted that the flexible layer 5 needs to have the certain compression amount, so that all materials capable of achieving the above effect can serve as the so-called flexible layer 5 above. Optionally, a material of the flexible layer 5 is rubber.

Optionally, the sliding middle frame 1 contacts with one side, facing away from the display screen 6, of the supporting chain 3.

Figure 3:
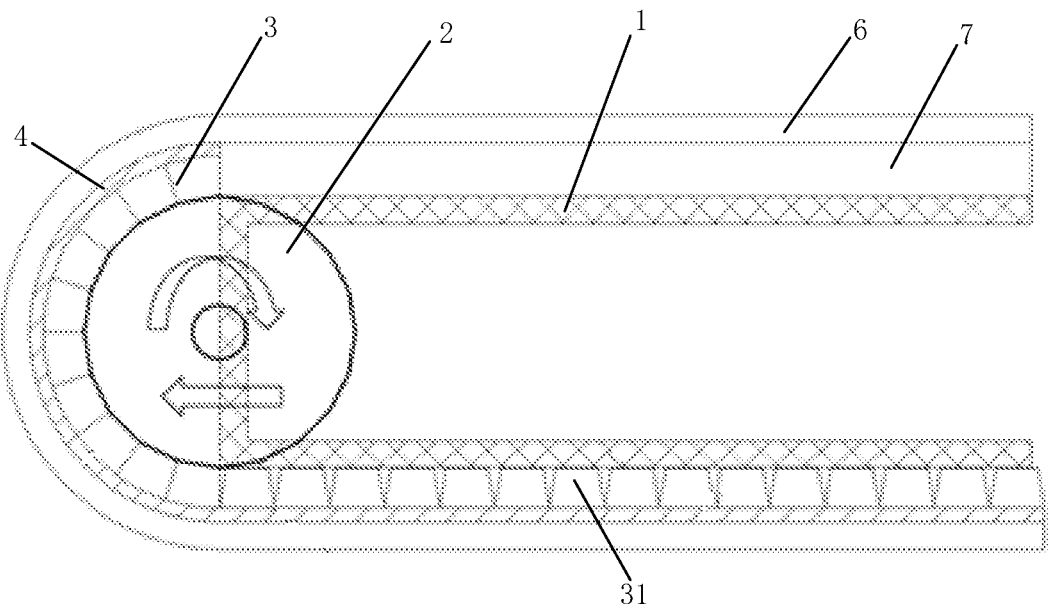
FIG. 3 is a schematic structural diagram of a curled state of an under-screen supporting structure provided by an embodiment of the present disclosure applied to a display apparatus.
Figure 4:
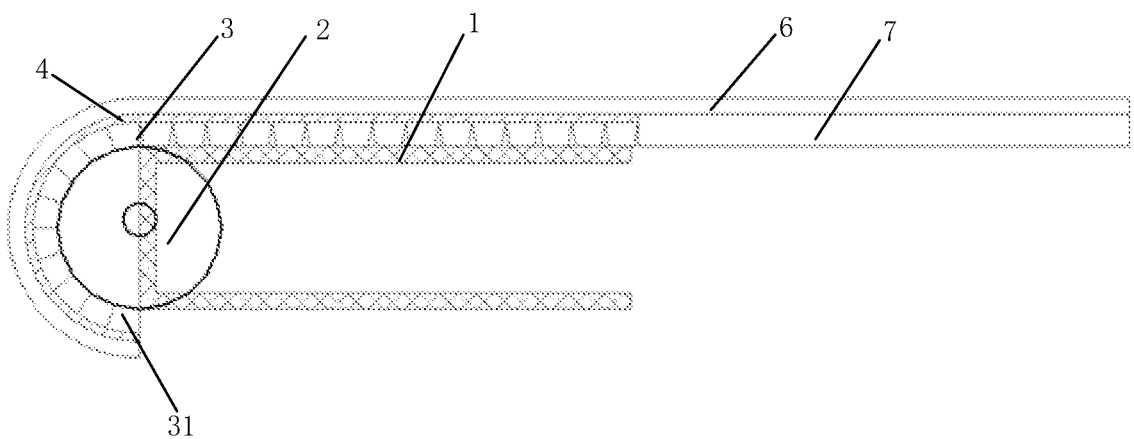
FIG. 4 is a schematic structural diagram of an unfolding state of an under-screen supporting structure provided by an embodiment of the present disclosure applied to a display apparatus.

In one possible implementation, as shown in FIG. 3 and FIG. 4, the under-screen supporting chain 3 is matched with the polygonal rotating shaft 2 to ensure that the display screen 6 is uniformly unfolded. The supporting chain 3 below a flattened part of the display screen 6 contacts with the complete machine sliding middle frame 1, so that surface flatness and supporting performance are improved, and a touch control effect is guaranteed. The supporting chain 3 below the display screen 6 at a curved surface of the rotating shaft 2 is matched with the polygonal rotating shaft 2, so that the slipping or loosening phenomenon is avoided. A tail end of a shell is fixed to a torsion spring to provide constant tension during rolling. Due to the fact that the under-screen supporting chain 3 is matched with the sliding middle frame 1 and the rotating shaft 2, local warping of the screen is avoided, and the display screen 6 is used more stably.

Figure 5:
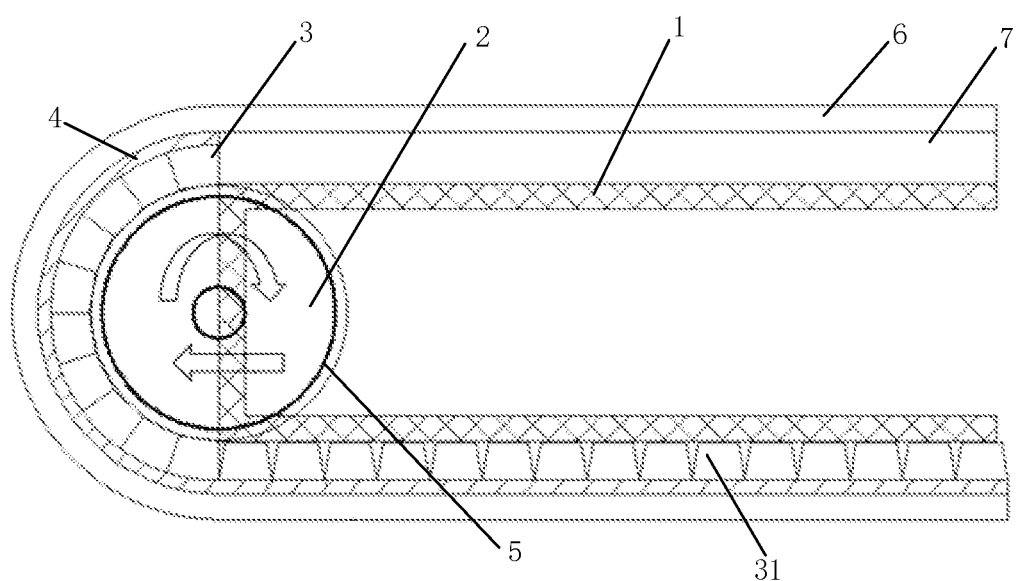
FIG. 5 is a schematic structural diagram of a curled state of another under-screen supporting structure provided by an embodiment of the present disclosure applied to a display apparatus.

As shown in FIG. 3 to FIG. 5, an embodiment of the present disclosure further provides a display apparatus, including a display screen 6, a fixed machine shell 7 and the above under-screen supporting structure.

A rolling and sliding part of the display screen 6 is in transmission connection with a rotating shaft 2 in the under-screen supporting structure through a supporting chain 3 in the under-screen supporting structure.

A non-rolling and non-sliding part of the display screen 6 is fixed on the fixed machine shell 7.

In the above display apparatus, the non-rolling and non-sliding part of the display screen 6 is fixed on the complete machine fixed machine shell 7, a silica gel layer is arranged below the rolling and sliding part, a plurality of sections of supporting steel strips are adhered to silica gel to form the supporting chain 3, and the supporting chain 3 is wound on the rotating shaft 2. In rolling and sliding processes, namely from a curled state shown in FIG. 3 to an unfolded state shown in FIG. 4, the sliding middle frame 1 drives the display screen 6 to be unfolded, and the curled display screen 6 drives the rotating shaft 2 to rotate through the supporting chain 3, so that the display screen 6 is uniformly unfolded, local warping of the screen is avoided, and the display screen 6 is used more stably.

Obviously, those skilled in the art can make various modifications and variations to the present disclosure without departing from the spirit and scope of the present disclosure. In this way, if these modifications and variations of the present disclosure fall within the scope of the claims of the present disclosure and their equivalent art, the present disclosure also intends to include these modifications and variations.

What is claimed is:

1. An under-screen supporting structure, configured to support a rollable and slidable display screen in a display apparatus, and comprising:
   a sliding middle frame,
   a rotating shaft, and
   a supporting chain, wherein
      the rotating shaft is installed on one side, facing a rolling and sliding part of the display screen, of the sliding middle frame, and the rotating shaft is in transmission connection with the display screen through the supporting chain; and
      the supporting chain comprises a plurality of sections of supporting strips, and an extending direction of the supporting strips is parallel to an axis of the rotating shaft; and cross sections, perpendicular to the axis of the rotating shaft, of the supporting strips are trapezoidal, and sizes of one side, facing away from the rotating shaft, of the supporting strips are greater than sizes of another one side, close to the rotating shaft, of the supporting strips;
   wherein one side, facing away from the rotating shaft, of the supporting chain is in transmission connection with the display screen through a buffer layer;
      wherein a material of the buffer layer is silica gel;
   wherein the buffer layer is disposed between the rolling and sliding part of the display screen and the supporting chain, to prevent the supporting chain from damaging the display screen;
   wherein the sliding middle frame contacts with one side, facing away from the display screen, of the supporting chain;
   wherein an outer ring of the rotating shaft is a polygon, and any edge of the polygon is matched with any section of the supporting strips;
   wherein a length of any edge of the polygon is equal to a size of one side, close to the rotating shaft, of any section of the supporting strips.

2. The under-screen supporting structure according to claim 1, wherein when the supporting chain is in a flattened state, an included angle θ between two adjacent side surfaces of every two adjacent sections of supporting strips and the number n of edges of the polygon meet a following relation:

$$\theta = 360°/n.$$

3. The under-screen supporting structure according to claim 1, wherein an outer ring of the rotating shaft is circular.

4. The under-screen supporting structure according to claim 3, wherein a flexible layer is arranged between the rotating shaft and the supporting chain.

5. The under-screen supporting structure according to claim 4, wherein a material of the flexible layer is rubber.

6. A display apparatus, comprising a display screen, a fixed machine shell, and an under-screen supporting structure, wherein
   a rolling and sliding part of the display screen is in transmission connection with a rotating shaft in the under-screen supporting structure through a supporting chain in the under-screen supporting structure; and
   a non-rolling and non-sliding part of the display screen is fixed on the fixed machine shell;
   wherein the under-screen supporting structure, configured to support a rollable and slidable display screen in a display apparatus, and comprising:
      a sliding middle frame,
      a rotating shaft, and
      a supporting chain, wherein
         the rotating shaft is installed on one side, facing the rolling and sliding part of the display screen, of the sliding middle frame, and the rotating shaft is in transmission connection with the display screen through the supporting chain; and
         the supporting chain comprises a plurality of sections of supporting strips, and an extending direction of the supporting strips is parallel to an axis of the rotating shaft; and cross sections, perpendicular to the axis of the rotating shaft, of the supporting strips are trapezoidal, and sizes of one side, facing away from the rotating shaft, of the supporting strips are greater than sizes of another one side, close to the rotating shaft, of the supporting strips;
   wherein one side, facing away from the rotating shaft, of the supporting chain is in transmission connection with the display screen through a buffer layer; wherein a material of the buffer layer is silica gel;
   wherein the buffer layer is disposed between the rolling and sliding part of the display screen and the supporting chain, to prevent the supporting chain from damaging the display screen;
   wherein the sliding middle frame contacts with one side, facing away from the display screen, of the supporting chain;
   wherein an outer ring of the rotating shaft is a polygon, and any edge of the polygon is matched with any section of the supporting strips;
   wherein a length of any edge of the polygon is equal to a size of one side, close to the rotating shaft, of any section of the supporting strips.

7. The display apparatus according to claim 6, wherein when the supporting chain is in a flattened state, an included angle θ between two adjacent side surfaces of every two adjacent sections of supporting strips and the number n of edges of the polygon meet a following relation:

$$\theta = 360°/n.$$

8. The display apparatus according to claim 6, wherein an outer ring of the rotating shaft is circular.

9. The display apparatus according to claim 8, wherein a flexible layer is arranged between the rotating shaft and the supporting chain.

10. The display apparatus according to claim 9, wherein a material of the flexible layer is rubber.

11. The under-screen supporting structure according to claim 1, wherein in a clockwise rolling and sliding process of the display screen, a leftward moving distance of the sliding middle frame is equal to a rotating arc length of the rotating shaft.

* * * * *